US010155134B2

(12) United States Patent
Dugan

(10) Patent No.: US 10,155,134 B2
(45) Date of Patent: Dec. 18, 2018

(54) SYSTEM AND METHOD FOR IMPROVING FITNESS EQUIPMENT AND EXERCISE

(71) Applicant: Brian M. Dugan, Sleepy Hollow, NY (US)

(72) Inventor: Brian M. Dugan, Sleepy Hollow, NY (US)

(*) Notice: Subject to any disclaimer, the term of this patent is extended or adjusted under 35 U.S.C. 154(b) by 0 days.

(21) Appl. No.: 15/920,449

(22) Filed: Mar. 13, 2018

(65) Prior Publication Data
US 2018/0200577 A1 Jul. 19, 2018

Related U.S. Application Data

(63) Continuation of application No. 15/393,247, filed on Dec. 28, 2016, now Pat. No. 9,937,382, which is a
(Continued)

(51) Int. Cl.
*A63B 24/00* (2006.01)
*A63F 13/335* (2014.01)
(Continued)

(52) U.S. Cl.
CPC .......... *A63B 24/0062* (2013.01); *A63B 22/02* (2013.01); *A63B 22/04* (2013.01);
(Continued)

(58) Field of Classification Search
CPC . A63B 24/0062; A63B 24/00; A63B 71/0622; A63B 220/36; A63B 220/20;
(Continued)

(56) References Cited

U.S. PATENT DOCUMENTS 3,834,702 A 9/1974 Bliss
4,484,743 A 11/1984 Williams
(Continued)

FOREIGN PATENT DOCUMENTS

EP 1 292 217 B1 11/2005
EP 1 639 939 3/2006
(Continued)

OTHER PUBLICATIONS

Busch, Fritz "Diabetes Institute Brings Dakota, New Ulm Together" Jun. 10, 2001. Ogden Newspapers, Inc.
(Continued)

*Primary Examiner* — Glenn Richman
(74) *Attorney, Agent, or Firm* — Dugan & Dugan, PC

(57) ABSTRACT

In a first aspect, a method is provided that includes the steps of (1) providing a monitor for determining a level of exercise performance performed by an exerciser and for outputting a signal representative of the performance level; (2) using the monitor to measure a level of exercise performance performed by an exerciser; (3) outputting from the monitor a signal representative of the performance level; (4) providing a video game having a character, the video game inputting and being responsive to the performance level signal output by the monitor, the video game using the performance level signal to control a performance level of the video game character; and (5) while the exerciser is not exercising, controlling a performance level of the video game character based on a performance level signal output by the monitor.

22 Claims, 2 Drawing Sheets

Related U.S. Application Data continuation of application No. 15/208,598, filed on Jul. 12, 2016, now Pat. No. 9,566,472, which is a continuation of application No. 15/017,562, filed on Feb. 5, 2016, now Pat. No. 9,409,054, which is a continuation of application No. 14/619,064, filed on Feb. 10, 2015, now Pat. No. 9,272,185, which is a continuation of application No. 14/313,995, filed on Jun. 24, 2014, now Pat. No. 8,979,711, which is a continuation of application No. 14/172,859, filed on Feb. 4, 2014, now Pat. No. 8,784,273, which is a continuation of application No. 14/023,892, filed on Sep. 11, 2013, now Pat. No. 8,672,812, which is a continuation of application No. 13/942,605, filed on Jul. 15, 2013, now Pat. No. 8,556,778, which is a continuation of application No. 13/183,405, filed on Jul. 14, 2011, now Pat. No. 8,506,458, which is a continuation of application No. 10/094,396, filed on Mar. 8, 2002, now abandoned.

(60) Provisional application No. 60/274,306, filed on Mar. 8, 2001.

(51) Int. Cl.

| | | |
|---|---|---|
| A63F 13/816 | (2014.01) | |
| A63F 13/85 | (2014.01) | |
| A63F 13/65 | (2014.01) | |
| A63B 71/06 | (2006.01) | |
| A63F 13/40 | (2014.01) | |
| A63B 22/06 | (2006.01) | |
| A63F 13/30 | (2014.01) | |
| A63F 13/211 | (2014.01) | |
| A63F 13/45 | (2014.01) | |
| A63F 13/92 | (2014.01) | |
| A63B 22/02 | (2006.01) | |
| A63B 22/04 | (2006.01) | |
| G06F 19/00 | (2018.01) | |

(52) U.S. Cl.
CPC .......... *A63B 22/0605* (2013.01); *A63B 24/00* (2013.01); *A63B 71/0622* (2013.01); *A63F 13/10* (2013.01); *A63F 13/12* (2013.01); *A63F 13/211* (2014.09); *A63F 13/335* (2014.09); *A63F 13/45* (2014.09); *A63F 13/65* (2014.09); *A63F 13/816* (2014.09); *A63F 13/85* (2014.09); *A63F 13/92* (2014.09); *G06F 19/00* (2013.01); *A63B 2022/0652* (2013.01); *A63B 2220/20* (2013.01); *A63B 2220/34* (2013.01); *A63B 2220/40* (2013.01); *A63B 2220/62* (2013.01); *A63B 2230/06* (2013.01); *A63B 2230/062* (2013.01); *A63B 2230/755* (2013.01); *A63F 2300/69* (2013.01); *A63F 2300/8029* (2013.01)

(58) Field of Classification Search
CPC . A63B 220/40; A63B 220/62; A63B 2230/06; A63B 2230/062; A63B 2230/755; A63B 22/0605; A63B 22/02; A63B 22/04; A63F 13/335; A63F 13/816; A63F 13/85; A63F 13/65; A63F 13/10; A63F 13/12; A63F 13/211; A63F 13/45; A63F 13/92; A63F 2300/69; A63F 2300/8029; G06F 19/00
See application file for complete search history.

(56) References Cited

U.S. PATENT DOCUMENTS

| | | | |
|---|---|---|---|
| 4,542,897 | A | 9/1985 | Melton et al. |
| 4,735,410 | A | 4/1988 | Nobuta |
| 4,817,938 | A | 4/1989 | Nakao et al. |
| 4,858,930 | A | 8/1989 | Sato |
| 4,976,435 | A * | 12/1990 | Shatford ............ A63B 24/0087 345/156 |
| 5,001,632 | A * | 3/1991 | Hall-Tipping ...... A61B 5/02455 463/23 |
| 5,142,358 | A | 8/1992 | Jason |
| 5,246,411 | A * | 9/1993 | Rackman ............ A63B 71/0622 348/552 |
| RE34,728 | E | 9/1994 | Hall-Tipping |
| 5,362,069 | A | 11/1994 | Hall-Tipping |
| 5,377,100 | A | 12/1994 | Pope et al. |
| 5,462,504 | A | 10/1995 | Trulaske et al. |
| 5,515,865 | A | 5/1996 | Scanlon |
| 5,527,239 | A | 6/1996 | Abbondanza |
| 5,591,104 | A * | 1/1997 | Andrus ................ A61B 5/6887 434/247 |
| 5,592,401 | A | 1/1997 | Kramer |
| 5,624,316 | A | 4/1997 | Roskowski et al. |
| 5,645,513 | A * | 7/1997 | Haydocy ............. A63B 71/0622 482/3 |
| 5,667,459 | A * | 9/1997 | Su .......................... A63F 13/816 482/4 |
| 5,672,107 | A | 9/1997 | Clayman |
| 5,702,323 | A * | 12/1997 | Poulton ................. A63B 24/00 482/8 |
| 5,781,698 | A | 7/1998 | Teller et al. |
| 5,839,990 | A * | 11/1998 | Virkkala ................ A63F 13/06 482/8 |
| 5,885,156 | A | 3/1999 | Toyohara et al. |
| 5,902,250 | A | 5/1999 | Verrier et al. |
| 5,918,603 | A | 7/1999 | Brown |
| 5,928,133 | A | 7/1999 | Halyak |
| 5,947,868 | A | 9/1999 | Dugan |
| 6,013,007 | A | 1/2000 | Root et al. |
| 6,024,675 | A | 2/2000 | Kashiwaguchi |
| 6,062,216 | A | 5/2000 | Corn |
| 6,066,075 | A | 5/2000 | Poulton |
| 6,152,856 | A | 11/2000 | Studor et al. |
| 6,179,713 | B1 | 1/2001 | James et al. |
| D439,981 | S | 4/2001 | Kasabach et al. |
| 6,213,872 | B1 | 4/2001 | Harada et al. |
| 6,244,988 | B1 | 6/2001 | Delman |
| 6,251,010 | B1 | 6/2001 | Tajiri et al. |
| 6,267,677 | B1 | 7/2001 | Tajiri et al. |
| 6,302,789 | B2 | 10/2001 | Harada et al. |
| 6,321,158 | B1 | 11/2001 | Root |
| D451,604 | S | 12/2001 | Kasabach et al. |
| 6,347,993 | B1 | 2/2002 | Kondo et al. |
| 6,354,940 | B1 | 3/2002 | Itou et al. |
| 6,375,572 | B1 | 4/2002 | Masuyama et al. |
| D460,971 | S | 7/2002 | Sica et al. |
| 6,456,749 | B1 | 9/2002 | Kasabach et al. |
| 6,482,092 | B1 | 11/2002 | Tajiri et al. |
| 6,494,830 | B1 | 12/2002 | Wessel |
| 6,513,160 | B2 | 1/2003 | Dureau |
| 6,514,199 | B1 | 2/2003 | Alessandri |
| 6,527,711 | B1 | 3/2003 | Stivoric et al. |
| 6,579,231 | B1 | 6/2003 | Phipps |
| 6,585,622 | B1 | 7/2003 | Shum et al. |
| 6,595,858 | B1 | 7/2003 | Tajiri et al. |
| 6,595,929 | B2 | 7/2003 | Stivoric et al. |
| 6,605,038 | B1 | 8/2003 | Teller et al. |
| 6,628,847 | B1 | 9/2003 | Kasabach et al. |
| 6,641,482 | B2 | 11/2003 | Masuyama et al. |
| 6,652,383 | B1 | 11/2003 | Sonoda et al. |
| 6,702,719 | B1 | 3/2004 | Brown et al. |
| 6,705,972 | B1 | 3/2004 | Takano et al. |
| 6,720,983 | B1 | 4/2004 | Massaro et al. |
| 6,746,371 | B1 | 6/2004 | Brown et al. |
| 6,758,746 | B1 | 7/2004 | Hunter et al. |
| 6,786,825 | B2 | 9/2004 | Kawazu |

(56) References Cited

U.S. PATENT DOCUMENTS

| | | |
|---|---|---|
| 6,796,927 B2 | 9/2004 | Toyama |
| 6,881,176 B2 | 4/2005 | Oishi et al. |
| 6,888,779 B2 | 5/2005 | Mollicone et al. |
| 6,902,513 B1 | 6/2005 | McClure |
| 6,966,837 B1 | 11/2005 | Best |
| 7,020,508 B2 | 3/2006 | Stivoric et al. |
| 7,041,049 B1 | 5/2006 | Raniere |
| 7,057,551 B1 | 6/2006 | Vogt |
| 7,068,860 B2 | 6/2006 | Kasabach et al. |
| 7,153,262 B2 | 12/2006 | Stivoric et al. |
| 7,261,690 B2 | 8/2007 | Teller et al. |
| 7,285,090 B2 | 10/2007 | Stivoric et al. |
| 7,628,730 B1 | 12/2009 | Watterson et al. |
| 7,749,056 B2 | 7/2010 | Ando et al. |
| 7,789,800 B1 | 9/2010 | Watterson et al. |
| 7,837,595 B2 * | 11/2010 | Rice .................. A63B 71/0622 434/61 |
| 7,931,563 B2 | 4/2011 | Shaw et al. |
| 7,934,983 B1 | 5/2011 | Eisner |
| 7,946,959 B2 | 5/2011 | Shum et al. |
| 8,188,868 B2 | 5/2012 | Case, Jr. |
| 8,287,383 B1 | 10/2012 | Etter et al. |
| 8,287,436 B2 | 10/2012 | Shum et al. |
| 8,292,743 B1 | 10/2012 | Etter et al. |
| 8,313,416 B2 | 11/2012 | Ellis et al. |
| 8,444,491 B2 | 5/2013 | Bethke et al. |
| 8,491,395 B2 | 7/2013 | Auterio et al. |
| 8,496,532 B1 | 7/2013 | Bethke et al. |
| 8,506,409 B2 | 8/2013 | Bethke et al. |
| 8,556,778 B1 | 10/2013 | Dugan |
| 8,608,570 B1 | 12/2013 | Mahajan et al. |
| 2002/0019296 A1 | 2/2002 | Freeman |
| 2002/0019586 A1 | 2/2002 | Teller et al. |
| 2002/0022516 A1 | 2/2002 | Forden |
| 2002/0080035 A1 | 6/2002 | Youdenko |
| 2002/0082065 A1 | 6/2002 | Fogel et al. |
| 2002/0082077 A1 | 6/2002 | Johnson et al. |
| 2002/0090985 A1 | 7/2002 | Tochner et al. |
| 2002/0151992 A1 | 10/2002 | Hoffberg et al. |
| 2002/0160883 A1 | 10/2002 | Dugan |
| 2002/0163495 A1 | 11/2002 | Doynov |
| 2003/0224337 A1 | 12/2003 | Shum et al. |
| 2004/0023761 A1 | 2/2004 | Emery |
| 2004/0053690 A1 | 3/2004 | Fogel et al. |
| 2005/0068169 A1 | 3/2005 | Copley et al. |
| 2005/0075214 A1 | 4/2005 | Brown |
| 2005/0101845 A1 | 5/2005 | Nihtila |
| 2005/0177051 A1 | 8/2005 | Almen |
| 2005/0227811 A1 | 10/2005 | Shum et al. |
| 2005/0275541 A1 | 12/2005 | Sengupta et al. |
| 2006/0025282 A1 | 2/2006 | Redmann |
| 2006/0031102 A1 | 2/2006 | Teller et al. |
| 2006/0040793 A1 | 2/2006 | Martens |
| 2006/0089543 A1 | 4/2006 | Kim et al. |
| 2006/0122474 A1 | 6/2006 | Teller et al. |
| 2006/0224051 A1 | 10/2006 | Teller et al. |
| 2006/0264730 A1 | 11/2006 | Stivoric et al. |
| 2006/0281543 A1 | 12/2006 | Sutton et al. |
| 2007/0004482 A1 | 1/2007 | Ando et al. |
| 2007/0038038 A1 | 2/2007 | Stivoric et al. |
| 2007/0053513 A1 | 3/2007 | Hoffberg |
| 2007/0111858 A1 | 5/2007 | Dugan |
| 2007/0167204 A1 | 7/2007 | Lyle et al. |
| 2007/0173705 A1 | 7/2007 | Teller et al. |
| 2007/0197274 A1 | 8/2007 | Dugan |
| 2007/0208233 A1 | 9/2007 | Kovacs |
| 2007/0260482 A1 | 11/2007 | Nurmela et al. |
| 2007/0265138 A1 | 11/2007 | Ashby |
| 2008/0027337 A1 | 1/2008 | Dugan et al. |
| 2008/0094226 A1 | 4/2008 | O'Shea et al. |
| 2008/0129518 A1 | 6/2008 | Carlton-Foss |
| 2008/0146892 A1 | 6/2008 | LeBoeuf et al. |
| 2008/0167861 A1 | 7/2008 | Inoue et al. |
| 2008/0191864 A1 | 8/2008 | Wolfson |
| 2008/0218310 A1 | 9/2008 | Alten et al. |
| 2008/0281633 A1 | 11/2008 | Burdea et al. |
| 2008/0318679 A1 | 12/2008 | Tran et al. |
| 2009/0005140 A1 | 1/2009 | Rose et al. |
| 2009/0121894 A1 | 5/2009 | Wilson et al. |
| 2009/0270743 A1 | 10/2009 | Dugan et al. |
| 2010/0033303 A1 | 2/2010 | Dugan et al. |
| 2010/0056340 A1 | 3/2010 | Ellis et al. |
| 2010/0160041 A1 | 6/2010 | Grant et al. |
| 2010/0240458 A1 | 9/2010 | Gaiba et al. |
| 2010/0287011 A1 | 11/2010 | Muchkaev |
| 2011/0065504 A1 | 3/2011 | Dugan et al. |
| 2011/0082008 A1 | 4/2011 | Cheung et al. |
| 2011/0190055 A1 | 8/2011 | Leyvand et al. |
| 2011/0260830 A1 | 10/2011 | Weising |
| 2011/0275483 A1 | 11/2011 | Dugan et al. |
| 2011/0312470 A1 | 12/2011 | Hickman |
| 2012/0208676 A1 | 8/2012 | Shum et al. |
| 2012/0252580 A1 | 10/2012 | Dugan |
| 2012/0253487 A1 | 10/2012 | Dugan |
| 2012/0253489 A1 | 10/2012 | Dugan |
| 2012/0306643 A1 | 12/2012 | Dugan |
| 2013/0006736 A1 | 1/2013 | Bethke et al. |
| 2013/0252731 A1 | 9/2013 | Dugan et al. |
| 2014/0011640 A1 | 1/2014 | Dugan |
| 2014/0155129 A1 | 6/2014 | Dugan |
| 2014/0309083 A1 | 10/2014 | Dugan |
| 2015/0065213 A1 | 3/2015 | Dugan |
| 2015/0151162 A1 | 6/2015 | Dugan |
| 2016/0151670 A1 | 6/2016 | Dugan |
| 2016/0317869 A1 | 11/2016 | Dugan |
| 2017/0106242 A1 | 4/2017 | Dugan |
| 2017/0282078 A1 | 10/2017 | Dugan |

FOREIGN PATENT DOCUMENTS

| | | |
|---|---|---|
| EP | 1 292 218 B1 | 4/2006 |
| EP | 1 702 560 | 9/2006 |
| EP | 1 743 571 A2 | 1/2007 |
| JP | 59-170173 | 9/1984 |
| JP | 08103568 | 4/1996 |
| WO | WO 96/05766 | 2/1996 |
| WO | WO 01/96986 A2 | 12/2001 |
| WO | WO 02/00111 | 1/2002 |
| WO | WO 02/078538 A2 | 10/2002 |
| WO | WO 03/015005 A2 | 2/2003 |
| WO | WO 2004/019172 A2 | 3/2004 |
| WO | WO 2004/032715 A2 | 4/2004 |
| WO | WO 2004/034221 A2 | 4/2004 |
| WO | WO 2005/016124 A2 | 2/2005 |
| WO | WO 2005/027720 A2 | 3/2005 |
| WO | WO 2005/029242 A2 | 3/2005 |
| WO | WO 2005/092177 | 10/2005 |

OTHER PUBLICATIONS

"Bluetooth." Wikipedia: The Free Encyclopedia. Aug. 10, 2009 <http://en.wikipedia.org/wiki/Bluetooth>.

Ichinoseki-sekine et al., "Improving the Accuracy of Pedometer Used by the Elderly with the FFT Algorithm," Medicine & Science in Sports & Exercise 2006,1674-1681.

Mann, W. et al., "Smart Phones for the Elders: Boosting the Intelligence of Smart Homes," Am. Assoc. for Artificial Intell., (AAAI), Jul. 2002.

Office Action of U.S. Appl. No. 11/692,185 dated Mar. 12, 2014.

Preliminary Amendment of U.S. Appl. No. 10/094,396 dated May 20, 2002.

Office Action of U.S. Appl. No. 10/094,396 dated Oct. 4, 2004.

Mar. 4, 2005 Response to Office Action of U.S. Appl. No. 10/094,396 dated Oct. 4, 2004.

Final Office Action of U.S. Appl. No. 10/094,396 dated Jun. 2, 2005.

Nov. 2, 2005 Response to Final Office Action & RCE of U.S. Appl. No. 10/094,396 dated Jun. 2, 2005.

Office Action of U.S. Appl. No. 10/094,396 dated Feb. 9, 2006.

Aug. 9, 2006 Response to Office Action of U.S. Appl. No. 10/094,396 dated Feb. 9, 2006.

Office Action of U.S. Appl. No. 10/094,396 dated May 4, 2007.

(56) References Cited

OTHER PUBLICATIONS

Oct. 4, 2007 Response to Office Action of U.S. Appl. No. 10/094,396 dated May 4, 2007.
Office Action of U.S. Appl. No. 10/094,396 dated Jan. 25, 2008.
Jul. 25, 2008 Response to Office Action of U.S. Appl. No. 10/094,396 dated Jan. 25, 2008.
Final Office Action of U.S. Appl. No. 10/094,396 dated May 13, 2009.
Office Action of U.S. Appl. No. 10/094,396 dated Apr. 14, 2010.
Jul. 14, 2010 Response to Office Action of U.S. Appl. No. 10/094,396 dated Apr. 14, 2010.
Restriction Requirement of U.S. Appl. No. 10/094,396 dated May 4, 2004.
Jul. 2, 2004 Response to Restriction Requirement of U.S. Appl. No. 10/094,396 dated May 4, 2004.
Interview Summary of U.S. Appl. No. 10/094,396, filed Nov. 7, 2005.
Restriction Requirement and Examiner Interview Summary of U.S. Appl. No. 10/094,396 dated Oct. 31, 2006.
Jan. 31, 2007 Response to Restriction Requirement of U.S. Appl. No. 10/094,396 dated Oct. 31, 2006.
Final Office Action of U.S. Appl. No. 10/094,396 dated Oct. 14, 2010.
Notice of Abandonment of U.S. Appl. No. 10/094,396 dated Oct. 21, 2011.
Appeal Brief of U.S. Appl. No. 10/094,396, filed Dec. 14, 2009.
Office Action of U.S. Appl. No. 11/620,046 dated Nov. 12, 2009.
Feb. 12, 2010 Response to Office Action of U.S. Appl. No. 11/620,046 dated Nov. 12, 2009.
Final Office Action of U.S. Appl. No. 11/620,046 dated Jun. 23, 2010.
Restriction Requirement of U.S. Appl. No. 11/620,046 dated Jun. 23, 2009.
Jul. 24, 2009 Response to Restriction Requirement of U.S. Appl. No. 11/620,046 dated Jun 23, 2009.
Notice of Abandonment of U.S. Appl. No. 11/620,046 dated Jan. 21, 2011.
Office Action of U.S. Appl. No. 11/692,185 dated Oct. 7, 2009.
Jan. 7, 2010 Response to Office Action of U.S. Appl. No. 11/692,185 dated Oct. 7, 2009.
Final Office Action of U.S. Appl. No. 11/692,185 dated Mar. 3, 2010.
Appeal Brief of U.S. Appl. No. 11/692,185 dated Jun. 3, 2010.
Examiner Interview Summary of U.S. Appl. No. 11/692,185 dated Jan. 15, 2010.
Interview Summary of U.S. Appl. No. 11/692,185, filed Jan. 26, 2010.
Interview Summary of U.S. Appl. No. 11/692,185, filed Feb. 3, 2010.
Examiner Answer of U.S. Appl. No. 11/692,185 dated Sep. 22, 2010.
Reply Brief of U.S. Appl. No. 11/692,185, filed Nov. 22, 2010.
Decision on Appeal of U.S. Appl. No. 11/692,185 dated Dec. 13, 2013.
Office Action of U.S. Appl. No. 13/183,405 dated Apr. 30, 2012.
Oct. 28, 2012 Response to Apr. 30, 2012 Office Action of U.S. Appl. No. 13/183,405.
Final Office Action of U.S. Appl. No. 13/183,405 dated Mar. 25, 2013.
Jun. 3, 2013 Reply to Mar. 25, 2013 Final Office Action of U.S. Appl. No. 13/183,405.
Notice of Allowance of U.S. Appl. No. 13/183,405 dated Jun. 25, 2013.
Notice of Allowance of U.S. Appl. No. 13/942,605 dated Sep. 3, 2013.
Notice of Allowance of U.S. Appl. No. 14/023,892 dated Oct. 30, 2013.
Notice of Allowance of U.S. Appl. No. 14/172,859 dated Mar. 14, 2014.
Jun. 12, 2014 Reply to Mar. 12, 2014 Office Action of U.S. Appl. No. 11/692,185.
Examiner Interview Summary of U.S. Appl. No. 11/692,185 dated Jun. 16, 2014.
Preliminary Amendment of U.S. Appl. No. 14/313,995, filed Jul. 15, 2014.
Notice of Allowance of U.S. Appl. No. 11/692,185 dated Sep. 12, 2014.
Notice of Allowance & Examiner Interview Summary of U.S. Appl. No. 14/313,995 dated Oct. 28, 2014.
Amendment After Allowance Under 37 C.F.R. § 1.312 of U.S. Appl. No. 14/313,995, filed Nov. 10, 2014.
Supplemental Notice of Allowability of U.S. Appl. No. 14/313,995 dated Nov. 21, 2014.
Non-Final Office Action of U.S. Appl. No. 14/538,135 dated Dec. 22, 2015.
Non-Final Office Action of U.S. Appl. No. 14/619,064, dated Mar. 16, 2015.
Sep. 16, 2015 Reply and Terminal Disclaimer to Mar. 16, 2015 Non-Final Office Action of U.S. Appl. No. 14/619,064.
Notice of Allowance of U.S. Appl. No. 14/619,064, dated Oct. 15, 2015.
Preliminary Amendment and Terminal Disclaimer of U.S. Appl. No. 15/017,562, filed Mar. 7, 2016.
Preliminary Amendment of U.S. Appl. No. 15/017,562, filed Mar. 9, 2016.
Notice of Allowance and Applicant-Initiated Interview Summary of U.S. Appl. No. 15/017,562 dated Apr. 6, 2016.
May 23, 2016 Reply to Dec. 22, 2015 Non-Final Office Action of U.S. Appl. No. 14/538,135.
Supplemental Amendment of U.S. Appl. No. 14/538,135, filed Jun. 23, 2016.
Applicant-Initiated Interview Summary of U.S. Appl. No. 14/538,135 dated Jun. 27, 2016.
Applicant-Initiated Interview Summary of U.S. Appl. No. 14/538,135 dated Jun. 1, 2016.
Final Office Action of U.S. Appl. No. 14/538,135 dated Sep. 1, 2016.
Notice of Allowance of U.S. Appl. No. 15/208,598 dated Sep. 28, 2016.
Amendment After Allowance Rule 312 of U.S. Appl. No. 15/208,598, filed Dec. 28, 2016.
Response to Rule 312 Communication of U.S. Appl. No. 15/208,598 dated Jan. 17, 2017.
Examiner Interview Summary of U.S. Appl. No. 14/538,135, filed Mar. 1, 2017.
Notice of Allowance and Applicant-Initiated Interview Summary of U.S. Appl. No. 14/538,135 dated Mar. 10, 2017.
Non-Final Office Action of U.S. Appl. No. 15/393,247 dated Jun. 6, 2017.
Nov. 6, 2017 Reply and Terminal Disclaimer to Jun. 6, 2017 Non-Final Office Action of U.S. Appl. No. 15/393,247.
Notice of Allowance of U.S. Appl. No. 15/393,247 dated Nov. 29, 2017.
Amendment After Notice of Allowance (Rule 312) of U.S. Appl. No. 15/393,247, filed Feb. 27, 2018.
Response to Rule 312 Communication of U.S. Appl. No. 15/393,247 dated Mar. 8, 2018.

* cited by examiner

SYSTEM AND METHOD FOR IMPROVING FITNESS EQUIPMENT AND EXERCISE

This application is a continuation of and claims priority to U.S. patent application Ser. No. 15/393,247 filed Dec. 28, 2016, and titled "SYSTEM AND METHOD FOR IMPROVING FITNESS EQUIPMENT AND EXERCISE", which is a continuation of and claims priority to U.S. patent application Ser. No. 15/208,598 filed Jul. 12, 2016, and titled "SYSTEM AND METHOD FOR IMPROVING FITNESS EQUIPMENT AND EXERCISE", now U.S. Pat. No. 9,566,472, which is a continuation of and claims priority to U.S. patent application Ser. No. 15/017,562 filed Feb. 5, 2016, and titled "SYSTEM AND METHOD FOR IMPROVING FITNESS EQUIPMENT AND EXERCISE", now U.S. Pat. No. 9,409,054, which is a continuation of and claims priority to U.S. patent application Ser. No. 14/619,064 filed Feb. 10, 2015, and titled "SYSTEM AND METHOD FOR IMPROVING FITNESS EQUIPMENT AND EXERCISE", now U.S. Pat. No. 9,272,185, which is a continuation of and claims priority to U.S. patent application Ser. No. 14/313,995 filed Jun. 24, 2014, and titled "SYSTEM AND METHOD FOR IMPROVING FITNESS EQUIPMENT AND EXERCISE", now U.S. Pat. No. 8,979,711, which is a continuation of and claims priority to U.S. patent application Ser. No. 14/172,859 filed Feb. 4, 2014, and titled "SYSTEM AND METHOD FOR IMPROVING FITNESS EQUIPMENT AND EXERCISE", now U.S. Pat. No. 8,784,273, which is a continuation of and claims priority to U.S. patent application Ser. No. 14/023,892 filed Sep. 11, 2013, and titled "SYSTEM AND METHOD FOR IMPROVING FITNESS EQUIPMENT AND EXERCISE", now U.S. Pat. No. 8,672,812, which is a continuation of and claims priority to U.S. patent application Ser. No. 13/942,605 filed Jul. 15, 2013, and titled "SYSTEM AND METHOD FOR IMPROVING FITNESS EQUIPMENT AND EXERCISE", now U.S. Pat. No. 8,556,778, which is a continuation of and claims priority to U.S. patent application Ser. No. 13/183,405 filed Jul. 14, 2011, and titled "SYSTEM AND METHOD FOR IMPROVING FITNESS EQUIPMENT AND EXERCISE", now U.S. Pat. No. 8,506,458, which is a continuation of and claims priority to U.S. patent application Ser. No. 10/094,396 filed Mar. 8, 2002, and titled "SYSTEM AND METHOD FOR IMPROVING FITNESS EQUIPMENT AND EXERCISE", which claims priority to U.S. Provisional Patent Application Ser. No. 60/274,306, filed Mar. 8, 2001, and titled "INTERNET-BASED APPOINTMENT SCHEDULING". All of the above applications are hereby incorporated by reference herein in their entirety.

FIELD OF THE INVENTION

The present invention relates to exercise equipment and fitness activities, and more particularly to a system and method for improving fitness equipment and exercise.

BACKGROUND OF THE INVENTION

A fitness craze has recently swept the United States and many other countries. From fat-free potato chips to treadmills, people around the world have become obsessed with weight loss and healthy living. Accordingly, record numbers of new fitness products/exercise equipment have emerged to meet this obsession (including stair climbers, treadmills, recumbent bicycles, ski machines, and the like).

Many pieces of exercise equipment, when used regularly, are very useful for weight loss, for improving cardiovascular stamina, and for strengthening various muscles. However, most exercise equipment suffers from a major drawback: the equipment is boring to use because of its inability to successfully encourage a user (e.g., an exerciser) to continue exercising. As a result, most purchasers of exercise equipment stop using the equipment shortly after purchasing it.

A need therefore exists for a system and a method for making both existing and new exercise equipment more enjoyable by successfully stimulating and encouraging an exerciser to continue exercising. Such a system and a method will significantly improve both existing and new exercise equipment, as well as exercise itself (e.g., by making it more enjoyable).

U.S. Pat. No. 5,947,868 (the '868 patent) discloses, among other things, a system and method for improving fitness equipment and exercise. This patent is hereby incorporated by reference herein in its entirety. In one embodiment of the '868 patent, a monitor measures a performance level of an exerciser and outputs a performance level signal to a video game player (e.g., a hand-held video game player such as a Gameboy™ manufactured by Nintendo). The video game player monitors the performance level signal and controls the performance level of a video game character based on the signal. Additional methods and apparatus for encouraging or otherwise regulating exercise would also be desirable.

SUMMARY OF THE INVENTION

In a first aspect of the invention, a method is provided that includes the steps of (1) providing a monitor for determining a level of exercise performance performed by an exerciser and for outputting a signal representative of the performance level; (2) using the monitor to measure a level of exercise performance performed by an exerciser; (3) outputting from the monitor a signal representative of the performance level; (4) providing a video game having a character, the video game inputting and being responsive to the performance level signal output by the monitor, the video game using the performance level signal to control a performance level of the video game character; and (5) while the exerciser is not exercising, controlling a performance level of the video game character based on a performance level signal output by the monitor.

In a second aspect of the invention, a method is provided that includes the steps of (1) providing a video game having a video game character; (2) assigning an activity other than exercise or monetary payment; (3) determining if the activity was completed; and (4) if the activity was completed, improving a performance level of the video game character.

In a third aspect, a method is provided that includes the steps of (1) providing a video game having a video game character; (2) assigning an activity; and (3) improving a performance level of the video game character in exchange for an agreement that the exerciser or another party will perform the activity at a later time. Numerous other embodiments are provided, as are apparatus and computer program products for carrying out these and other aspects of the invention. Each computer program product may be carried by a medium readable by a computer (e.g., a carrier wave signal, a floppy disc, a hard drive, a random access memory, etc.).

Other objects, features and aspects of the present invention will become more fully apparent from the following detailed description of the preferred embodiments, the appended claims and the accompanying drawings.

DETAILED DESCRIPTION

Figure 1:
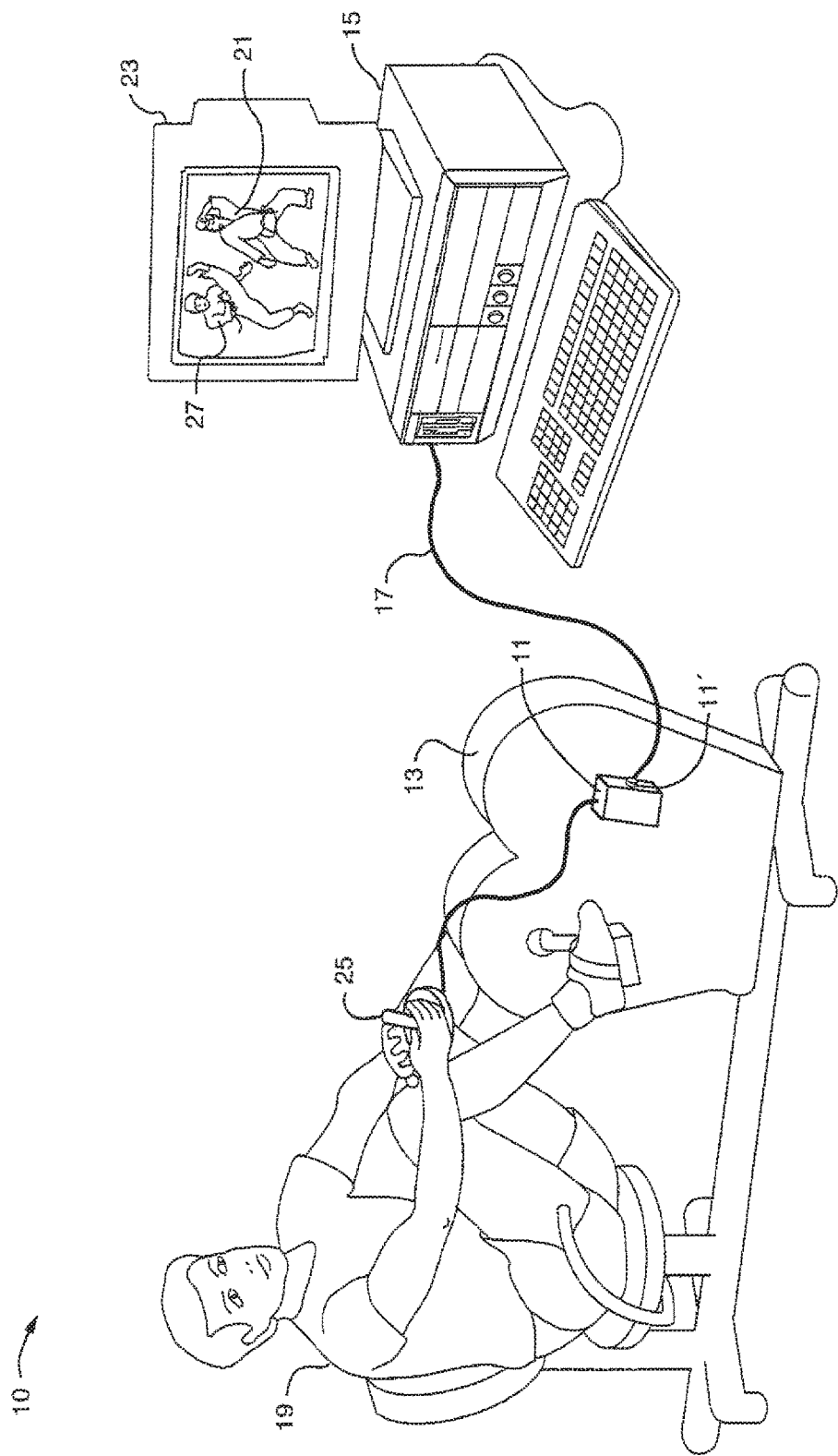
FIG. 1 is a schematic view of an exercise system for exercising in accordance with a first embodiment of the U.S. Pat. No. 5,947,868.

To further aid in the understanding of the present invention, the exercise system of U.S. Pat. No. 5,947,868 will be described herein. Specifically, FIG. 1 is a schematic view of an exercise system 10 configured in accordance with a first embodiment of U.S. Pat. No. 5,947,868. With reference to FIG. 1, the exercise system 10 comprises an exercise monitor 11 connected to a recumbent bicycle 13, and a computer 15 coupled to an output 11' of the exercise monitor 11 via a cable 17. Any other piece of exercise equipment may be similarly employed (e.g., a stair climber, a stationary bicycle, a rowing machine, etc.).

The exercise monitor 11 is configured to measure the pedal rate of an exerciser 19 riding the recumbent bicycle 13, and to output an approximately real-time measure of pedal rate via the output 11'. Other or additional exerciser performance levels (e.g., a measure of the length, intensity or some other characteristic of the exercise activity) may be monitored and output by monitor 11 or by other monitors. The pedal rate output by the monitor 11 is monitored by the computer 15 while the computer 15 runs a video game such as a martial arts video game (represented in FIG. 1 by a martial arts character 21 on a computer screen 23 coupled to the computer 15).

The exerciser 19 is shown holding a joystick 25 for controlling the kicking, punching and other movements of the martial arts character 21 on the computer screen 23. The joystick 25 may be directed connected to the computer 15 or coupled to the computer 15 via the monitor 11 as shown in FIG. 1. The joystick/computer connection also may be wireless.

In operation, as the exerciser 19 pedals the recumbent bicycle 13, the monitor 11 measures and outputs (via the output 11') a signal representative of the pedal rate of the exerciser 19. The pedal rate signal output by the monitor 11 is monitored by the computer 15 and is used to control the energy level (e.g., the strength and durability) of the martial arts character 21. Accordingly, the harder the exerciser 19 pedals the bicycle 13, the higher the energy level of the martial arts character 21, and the less likely the martial arts character 21 is to perish from an attack by an opponent martial arts character 27. By exercising harder, the exerciser 19 can therefore score higher or otherwise perform better at the video game.

Many different performance levels of the exerciser 19 can be monitored and used to control a video game character's performance levels (e.g., how the character behaves, reacts, etc.). Table 1 contains a representative list of exerciser performance levels that may be monitored as the exerciser 19 exercises on the recumbent bicycle 13 or on some other piece of exercise equipment, and possible video character performance levels that can be controlled for each monitored exerciser performance level. Table 1 is not intended as a limitation on monitorable performance levels and is merely exemplary.

TABLE 1

| MONITORED EXERCISER PERFORMANCE LEVEL | VIDEO GAME CHARACTER PERFORMANCE LEVEL CONTROLLED |
|---|---|
| pedaling rate | speed, striking force |
| stepping rate | speed, striking force |
| rowing rate | speed, striking force |
| running rate | speed, striking force |
| pulse rate | speed, energy level, accuracy |
| striking force | striking force |
| swing velocity | swing velocity |
| distance traveled | game level |
| time exercised | game level |

Accordingly, exercise equipment, such as the recumbent bicycle 13, and/or exercise is modified by placing an exercise monitor 11 (e.g., a pulse monitor, a distance meter, a rate monitor, a time monitor, a calorie meter, a strain gauge, an accelerometer and/or any other sensor for measuring the physical activity/performance level of an exerciser) on the equipment and/or the exerciser 19. The exercise monitor 11 outputs a signal representative of the performance level of the exerciser 19 (e.g., pulse rate, distance traveled, time exercised, rate of exercise, etc.) to a video game player (e.g., a computer 15) wirelessly or via a cable. The video game player may be a desk top computer, or preferably comprises a hand-held video game player such as a GameBoy™ (as described with reference to FIG. 2).

To stimulate the exerciser 19, the output from the exercise monitor 11 is used to control a parameter within a video game, such as a video game character 21's lifetime, energy level, striking force, accuracy, speed or the like. Similarly, a video game character 21 may be precluded from reaching a higher level in a game unless the exerciser 19 pedals fast enough, exercises long enough, has a high (or low) enough pulse rate or reaches some other performance level. Multiple performance level measurements of the exerciser 19 may be monitored and used to control multiple performance levels of the video game character 21 (e.g., pulse rate of the exerciser 19 dictates energy level/lifetime of the video game character 21, exercise rate controls the speed of or the striking force of the video game character 21, and duration/distance of exercise controls game level).

Examples of suitable video games include action-adventure games (e.g., military games, dungeon games, murder-mystery games, etc.), martial arts games, sports games (e.g., hiking, swimming, baseball, basketball, tennis, etc.), and other similar games. For instance, during a video baseball game, the force with which a batter strikes a baseball or the speed with which a player runs around a base may be controlled by the speed with which an exerciser pedals, climbs stairs, rows, etc. Similarly, the speed with which a football player rushes or passes, the power with which a boxer punches or a martial artist kicks, or the height to which a basketball player jumps may be similarly controlled. The "energy level" (e.g., a measure of how long a character can survive an event, attack, etc.) or lifetime of a character can be similarly controlled, or controlled by the pulse rate or other cardiovascular indicator of the exerciser. The key is to make the exerciser exercise harder or longer in order to continue the game or do better in the game. Accordingly, the exerciser is stimulated to work harder in exchange for some immediate success or gratification (e.g., doing better in the game). Preferably, game score/performance will increase with an increasing level of physical fitness (e.g., reduced pulse rate for a given exercise routine, harder workouts, etc.).

If desired, the video game player may analyze the data from the exercise monitor and compile statistics on the exerciser's performance. A database can be maintained for each new exerciser and updated after each exercise session so that progress charts and other statistics can be generated for each exerciser. If desired, other relevant data such as a exerciser's weight, body fat, and the like also may be stored and used to assess progress.

Figure 2:
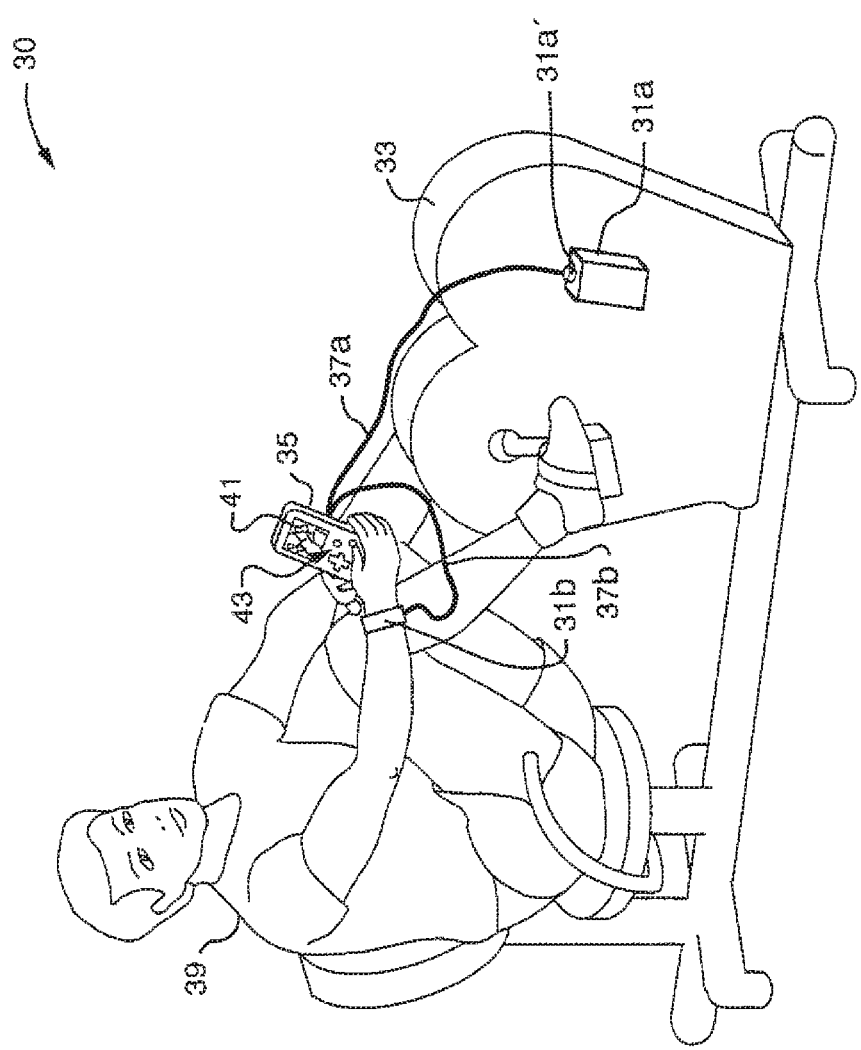
FIG. 2 is a schematic view of an exercise system for exercising in accordance with a second embodiment of U.S. Pat. No. 5,947,868.

FIG. 2 is a schematic view of an exercise system 30 configured in accordance with a second embodiment of U.S. Pat. No. 5,947,868. With reference to FIG. 2, the exercise system 30 comprises an exercise monitor 31a connected to a recumbent bicycle 33, and a hand-held video game player 35 (such as a GameBoy™ marketed by Nintendo) coupled to an output 31a' of the exercise monitor 31a via a first cable 37a.

The exercise monitor 31a is configured to measure the pedal rate of an exerciser 39 riding the recumbent bicycle 33, and to output an approximately real-time measure of pedal rate via the output 31a'. In addition to the exercise monitor 31a, an exercise monitor 31b is shown connected to the exerciser 39 and to the hand-held video game player 35 via a second cable 37b. The exercise monitor 31b is configured to measure the pulse rate of the exerciser 39. The pedal rate output by the monitor 31a and the pulse rate of the exerciser 39 output by the monitor 31b are monitored by the hand-held video game player 35 while the hand-held video game player 35 runs a video game such as a martial arts video game (represented in FIG. 2 by a martial arts character 41). The exerciser 39 is shown holding the hand-held video game player 35 and can control the kicking, punching and other movements of the martial arts character 41 via buttons 43 on the front of the hand-held video game player 35.

In operation, as the exerciser 39 pedals the recumbent bicycle 33, the monitor 31a measures and outputs a signal representative of the pedal rate of the exerciser 39, and the monitor 31b measures and outputs a signal representative of the pulse rate of the exerciser 39. The pedal rate signal output by the monitor 31a is monitored by the hand-held video game player 35 and is used to control the striking force of the martial arts character 41. The pulse rate signal output by the monitor 31b is monitored by the hand-held video game player 35 and is used to control the energy level of the martial arts character 41. Accordingly, the harder the exerciser 39 pedals the bicycle 33, the harder the martial arts character 41 can strike an opponent. However, the higher the pulse rate of the exerciser 39, the lower the energy level of the martial arts character 41, making the martial arts character 41 more susceptible to attack. By using the monitored performance levels of the exerciser 39 in this manner, to obtain higher and higher game scores, the exerciser 39 must become more and more cardiovascularly fit so that the exerciser 39 can pedal faster while maintaining a lower pulse rate. Cardiovascular fitness becomes a desirable goal of the exerciser 39 because such fitness yields immediate gratification (e.g., a higher game score).

EXEMPLARY EMBODIMENTS OF THE PRESENT INVENTION

In accordance with the present invention, numerous additional features are provided. For instance, the system of the '868 patent (e.g., via computer program code and/or hardware stored in either the computer 15 of FIG. 1 or in the hand-held video game player 35 of FIG. 2) may be configured to (1) at least attempt to prevent an exerciser from overexercising; (2) "reward" an exerciser for exercise performed before and/or after game play on the video game player; (3) "reward" a video game player (e.g., whether the game player is an exerciser) for behavior performed before and/or after game play. Other exercise systems than those of the '868 patent may similarly be configured in accordance with the present invention, and the principles of the present invention may be implemented in hardware, software (e.g., one or more computer program products) or a combination thereof.

In first aspect of the invention, the system of the '868 patent may be configured to attempt to prevent overexercising by monitoring a pulse rate of an exerciser and by stopping and/or suspending game play if the pulse rate is too high. Alternatively, blood pressure may be monitored. The appropriate pulse rate or blood pressure may be assessed based on age, weight, height, etc., of the exerciser. The video game player may be provided with any suitable interface for receiving information regarding pulse rate, blood pressure, the exerciser (e.g., age, weight, height, etc.) such as a keyboard interface, an infrared or other wireless interface, a serial or parallel cable interface, a USB connection interface, a mouse interface, a light pen interface, a network/Ethernet interface, an Internet interface, a dial-up connection interface, etc. Any other parameter or technique may be used to prevent/reduce overexercising such as monitoring time of exercise, number of steps climbed (e.g., for a stair climber), distance traveled (e.g., for a stationary bicycle or treadmill), or the like.

In a second aspect of the invention, an exerciser is rewarded after exercise is performed. For example, an exerciser may be provided with a "smart monitor" which monitors a performance level of exercise (e.g., pedal rate, step rate, length of exercise, pulse rate during exercise, or some other characteristic of exercise) and creates an "indicator" of the performance level. The indicator may be a code (e.g., an encrypted code) that is displayed to the exerciser, and that the exerciser may then provide to the video game player (e.g., via a keyboard, a light pen, via some other device such as a personal computer that couples to the video game player). Based on the code, the video game player "adjusts" the performance level of a video game character in a manner similar to that described in the '868 patent. In general the video game may be affected in any way by the code (e.g., which is a measure of exercise performance level). Thus, by improving video game character performance based on the code, an exerciser is rewarded for exercise performed before video game play.

Note that the use of a code is not required. The video game player itself may monitor exercise level for use during subsequent game play. For example, Joe may take a hand-held video game player (configured in accordance with the present invention) to a local gym, and may use the video game player to monitor his exercise level while running on a treadmill. The video game player may be provided with a clamp that holds the player on a rail of the treadmill or some other location. During exercise, the video game player may display conventional exercise information such as pulse rate, distance traveled, etc. After exercise, based on the exercise performance level of Joe, the video game player may "adjust" or otherwise affect the performance level of a video game character. Numerous options may be provided. For example, Joe may start a video game (before or during exercise), and the video game player may freeze or suspend play until Joe performs some required level of exercise (e.g., runs faster, cycles for 5 minutes, achieves a certain heart/pulse rate, etc.). Once Joe achieves the required exercise performance level, game play may be reinitiated. This may occur several times during an exercise session. Alternatively, video game character performance may only be affected after Joe has completely finished exercising.

As an additional feature, information regarding performance level of exercise may be communicated to a third party such as an insurance company, a medical facility, a weight loss clinic or any other relevant party. The third party may offer additional incentives for performing exercise (e.g., reduced insurance deductibles, free physicals, etc.), and may even set the performance level requirements for an exerciser (e.g., by programming the video game player, such as via a network like the Internet, via e-mail, etc.).

In a third aspect of the invention, a person is rewarded with improved video game play for non-exercise type activities. For example, game play may be enhanced (e.g., the performance level of a video game player may be improved) if a person (1) achieves a certain grade on a test, completes an education program or studies for a predefined time period; (2) eats at a certain restaurant (e.g., McDonalds); (3) completes a survey (e.g., by logging on to a Web site and completing the survey); (4) subscribes to a service (e.g., by switching to a certain long distance carrier or by agreeing to a magazine subscription); and/or (4) performs any other predefined task.

Another possible feature includes allowing a person to restart a video game that had previously ended (e.g., because a video game character was "killed") based on a subsequently performed task. Exemplary tasks include, exercising, achieving a certain grade, eating at a certain restaurant, completing a survey, subscribing to a magazine, etc.

The foregoing description discloses only exemplary embodiments of the invention; modifications of the above disclosed apparatus and method which fall within the scope of the invention will be readily apparent to those of ordinary skill in the art. For instance, any number of performance levels of an exerciser may be monitored and used to control any number of performance levels of a video game character, and the various monitors described herein may communicate with the video game player wirelessly. As well, conditions within a video game may be output by the video game player and used to increase/decrease the difficulty of exercise, or otherwise affect exercise, if so desired. Further, old video games may be modified for use with the present invention, or new video games may be developed.

Additionally, while the present invention has been described with reference to a single exerciser, it will be understood that the invention is equally applicable to multiple exerciser situations. For instance, different video game characters within the same video game may be controlled by different exercisers. That is, the performance level(s) of a first exerciser may control the performance level(s) of a first video game character, while the performance level(s) of a second exerciser may control the performance level(s) of a second video game character contained within the same video game as the first video game character. In this manner, the exerciser who exercises harder will have a gaming advantage over the other exerciser. Such multi-exerciser applications may be performed locally (e.g., all exercisers in the same room) or remotely (e.g., at least one exerciser in a different location who communicates remotely, such as over the INTERNET or the WORLD WIDE WEB).

Accordingly, while the present invention has been disclosed in connection with the preferred embodiments thereof, it should be understood that other embodiments may fall within the spirit and scope of the invention, as defined by the following claim.

The invention claimed is:

1. A method of exercise comprising:
providing a monitor for determining a level of exercise performance performed by an exerciser and for creating an indicator of the performance level for use after exercise;
using the monitor to measure a level of exercise performance performed by an exerciser and to create the indicator of performance level;
providing a video game having a character controlled by the user, the video game being responsive to the indicator of performance level of the monitor, the video game using the indicator of performance level to control a performance level of the user controlled video game character after the user has exercised;
determining if the user is at a certain location; and
affecting video game play within the video game if the user is at the certain location.

2. The method of claim 1 wherein affecting the video game includes affecting the user controlled video game character.

3. The method of claim 1 wherein affecting the video game includes allowing the user to restart the video game.

4. The method of claim 3 wherein allowing the user to restart the video game includes bringing back a previously defeated video game character within the video game.

5. The method of claim 1 wherein determining if the user is at a certain location includes determining if the user is at a certain restaurant.

6. The method of claim 1 wherein the indicator of performance level is a code.

7. The method of claim 1 further comprising communicating information regarding performance level of exercise to a third party.

8. The method of claim 1 wherein the monitor is part of a video game player.

9. The method of claim 5 wherein communications with the third party occur via the Internet.

10. The method of claim 5 further including receiving performance level requirements for the exerciser set by the third party.

11. A method of exercise comprising:
providing at least one monitor for determining a plurality of levels of exercise performance performed by an exerciser and for creating a plurality of indicators of the performance levels for use after exercise;
using the at least one monitor to measure the plurality of levels of exercise performance performed by an exerciser and to create the plurality of indicators of performance levels;
providing a video game having a character, the video game being responsive to the plurality of indicators of performance levels of the at least one monitor, the video game using the plurality of indicators of performance levels to control multiple performance levels or characteristics of the video game character after the user has exercised;
determining if the user is at a certain location; and
affecting video game play within the video game if the user is at the certain location.

12. The method of claim 11 wherein affecting the video game includes affecting the user controlled video game character.

13. The method of claim 11 wherein affecting the video game includes allowing the user to restart the video game.

14. The method of claim 13 wherein allowing the user to restart the video game includes bringing back a previously defeated video game character within the video game.

15. The method of claim 11 wherein determining if the user is at a certain location includes determining if the user is at the restaurant.

16. The method of claim 11 wherein the at least one monitor is part of a video game player.

17. The method of claim 11 further comprising at least one of communicating information regarding performance level of exercise to a third party and receiving performance level requirements for the exerciser set by the third party.

18. A method of exercise comprising:
   providing at least one monitor for determining a plurality of levels of exercise performance performed by an exerciser and for creating a plurality of indicators of the performance levels for use after exercise;
   using the at least one monitor to measure the plurality of levels of exercise performance performed by an exerciser and to create the plurality of indicators of performance levels;
   providing a video game having a character controlled by the user, the video game being responsive to the plurality of indicators of performance levels of the at least one monitor, the video game using the plurality of indicators of performance levels to control one or more performance levels or characteristics of the user controlled video game character after the user has exercised;
   determining if the user is at a certain location; and
   affecting video game play within the video game if the user is at the certain location.

19. The method of claim 18 wherein affecting the video game includes affecting the user controlled video game character.

20. The method of claim 18 wherein affecting the video game includes allowing the user to restart the video game.

21. The method of claim 20 wherein allowing the user to restart the video game includes bringing back a previously defeated video game character within the video game.

22. The method of claim 18 further comprising at least one of communicating information regarding performance level of exercise to a third party and receiving performance level requirements for the exerciser set by the third party.

* * * * *